(12) United States Patent
Haubner

(10) Patent No.: US 10,921,137 B2
(45) Date of Patent: Feb. 16, 2021

(54) DATA GENERATION METHOD FOR GENERATING AND UPDATING A TOPOLOGICAL MAP FOR AT LEAST ONE ROOM OF AT LEAST ONE BUILDING

(71) Applicant: AUDI AG, Ingolstadt (DE)

(72) Inventor: Florian Haubner, Willanzheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/499,021

(22) PCT Filed: Jun. 13, 2018

(86) PCT No.: PCT/EP2018/065660
§ 371 (c)(1),
(2) Date: Sep. 27, 2019

(87) PCT Pub. No.: WO2019/011564
PCT Pub. Date: Jan. 17, 2019

(65) Prior Publication Data
US 2020/0033141 A1    Jan. 30, 2020

(30) Foreign Application Priority Data
Jul. 10, 2017  (DE) .......................... 10 2017 211 712

(51) Int. Cl.
*G01C 21/34* (2006.01)
*G01C 21/32* (2006.01)
(Continued)

(52) U.S. Cl.
CPC .......... *G01C 21/32* (2013.01); *G01C 21/165* (2013.01); *G01C 21/206* (2013.01);
(Continued)

(58) Field of Classification Search
CPC .... G01C 21/32; G01C 21/165; G01C 21/206; G01C 21/34; H04W 4/33; H04W 4/48;
(Continued)

(56) References Cited

U.S. PATENT DOCUMENTS 5,311,195 A      5/1994  Mathis et al.
8,566,021 B2 *  10/2013  Smartt ................... G01C 21/32
                                                             701/409
(Continued)

FOREIGN PATENT DOCUMENTS

CN    101688910 A    3/2010
CN    103323012 A    9/2013
(Continued)

OTHER PUBLICATIONS

International Preliminary Report on Patentability directed to related International Patent Application No. PCT/EP2018/065660, completed Apr. 29, 2019, with attached English-language translation; 11 pages.

(Continued)

*Primary Examiner* — Shardul D Patel
(74) *Attorney, Agent, or Firm* — Sterne, Kessler, Goldstein & Fox P.L.L.C.

(57) ABSTRACT

The present disclosure relates to a data generation method for generating and updating at least one room in at least one building in the surroundings of a vehicle, by at least one vehicle, in which an assessment of characteristic motion is corrected without GPS reception by means of subsequently available GPS data, and used for at least one topological map for at least one room of at least one building.

9 Claims, 1 Drawing Sheet

(51) Int. Cl.
| | |
|---|---|
| *H04W 4/33* | (2018.01) |
| *H04W 4/48* | (2018.01) |
| *H04W 4/029* | (2018.01) |
| *G01C 21/16* | (2006.01) |
| *G01C 21/20* | (2006.01) |
| *G05D 1/02* | (2020.01) |
| *G08G 1/14* | (2006.01) |

(52) U.S. Cl.
CPC ......... *G05D 1/0225* (2013.01); *G05D 1/0234* (2013.01); *G08G 1/146* (2013.01); *H04W 4/029* (2018.02); *H04W 4/33* (2018.02); *H04W 4/48* (2018.02)

(58) Field of Classification Search
CPC ... H04W 4/029; G05D 1/0225; G05D 1/0234; G08G 1/146; G01S 19/393; G01S 19/39; G01S 19/14; G01S 19/49
USPC .................................................. 701/400, 533
See application file for complete search history.

(56) References Cited

U.S. PATENT DOCUMENTS

| | | | | |
|---|---|---|---|---|
| 2009/0063051 A1* | 3/2009 | Watanabe | ............... | G01C 21/26 701/472 |
| 2010/0138147 A1 | 6/2010 | T'Siobbel | | |
| 2010/0305851 A1 | 12/2010 | Meyer et al. | | |
| 2012/0084003 A1* | 4/2012 | Park | ....................... | G01C 21/20 701/439 |
| 2013/0059328 A1* | 3/2013 | Umemura | .......... | G01N 33/6893 435/36 |
| 2013/0065042 A1* | 3/2013 | Esser-Kahn | ............. | D02G 3/04 428/315.5 |
| 2013/0257657 A1 | 10/2013 | Garin et al. | | |
| 2013/0297198 A1 | 11/2013 | Vande Velde et al. | | |
| 2015/0119086 A1* | 4/2015 | Mirowski | ............ | G01C 21/206 455/456.6 |
| 2017/0131103 A1* | 5/2017 | Kurata | ................. | G01C 21/206 |

FOREIGN PATENT DOCUMENTS

| | | |
|---|---|---|
| CN | 103499350 A | 1/2014 |
| CN | 104819716 A | 8/2015 |
| CN | 105300395 A | 2/2016 |
| CN | 105324729 A | 2/2016 |
| CN | 106556854 A | 4/2017 |
| DE | 102014015073 A1 | 4/2016 |
| DE | 102015203016 A1 | 8/2016 |
| EP | 2191233 B1 | 6/2011 |
| EP | 3136054 A1 | 3/2017 |
| EP | 3136128 A1 | 3/2017 |
| TW | 201227604 A | 7/2012 |
| WO | WO 2010/088617 A1 | 8/2010 |
| WO | WO 2013/065042 A1 | 5/2013 |
| WO | WO 2013/188245 A1 | 12/2013 |
| WO | WO 2014/026338 A1 | 2/2014 |

OTHER PUBLICATIONS

International Search Report and Written Opinion of the International Searching Authority directed to related International Patent Application No. PCT/EP2018/065660, dated Sep. 27, 2018, with attached English-language translation; 16 pages.

* cited by examiner

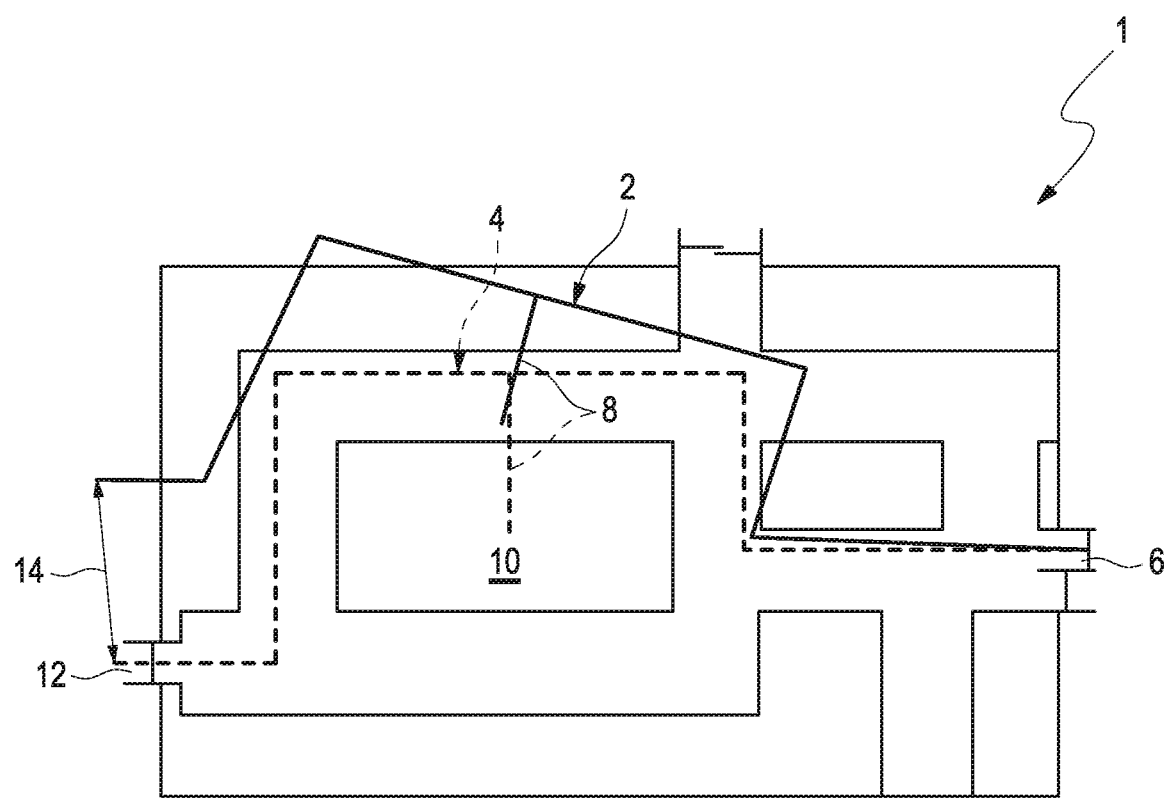

DATA GENERATION METHOD FOR GENERATING AND UPDATING A TOPOLOGICAL MAP FOR AT LEAST ONE ROOM OF AT LEAST ONE BUILDING

TECHNICAL FIELD

The present disclosure relates to a data generation method for generating and updating at least one room in at least one building in the surroundings of a vehicle, by at least one vehicle, in which an assessment of characteristic motion is corrected without GPS reception by means of subsequently available GPS data, and used for at least one topological map for at least one room of at least one building.

BACKGROUND

Currently, GPS data is used to generate topological maps or to update topological maps. These data include consecutive GPS locations from which road networks outside buildings can be automatically created and updated. This technology cannot be used because of the lack of GPS signal and more frequent maneuvers within buildings, such as parking garages, as a satellite connection is necessary.

Today, topological maps of buildings are usually digitized from orientation plans. However, these often have a high degree of imprecision, lack of actuality and scale errors. Furthermore, changes between floors, heading restrictions and the like can be mainly implemented manually in topological maps.

Another possibility for creating topological maps for building interiors is manual measurement with laser scanners and a subsequent manual post-processing of the data. Although these laser scanning methods are precise, they are also expensive and time-consuming. Regular updating of topological maps may be problematic.

DE 10 2015 203 016 A1 discloses a method for mapping a trajectory relative to prominent landmarks. The landmarks are detected by additional sensors.

EP 3 136 128 A1 describes a method for automatically determining a roadway shape based on crowd-based trajectory data. In the case of different trajectory data, matches are searched for on the basis of rotation and translation information, and the trajectory data is assembled on the basis of the matches.

WO 2014/026338 A1 discloses a method for creating indoor maps from data from an assessment of characteristic motion by mobile end devices.

BRIEF DESCRIPTION OF THE DRAWINGS/FIGURE

FIG. 1 shows a plan view of a schematic trajectory of a vehicle, in accordance with some embodiments.

DETAILED DESCRIPTION

The object of the present disclosure is to propose a method for the automated creation of topological maps of rooms by at least one vehicle.

In some embodiments, a data generation method for generating and updating at least one room in at least one building in the surroundings of a vehicle by at least one vehicle is disclosed. In this case, a position of at least one vehicle is determined with current GPS data in front of an entrance to the building. This is followed by an assessment of the trajectory of the at least one vehicle in at least one room of the at least one building by an assessment of characteristic motion of the at least one vehicle. Subsequently, when leaving the at least one building by the at least one vehicle, a characteristic motion error is determined by a comparison with current GPS data. An assessed trajectory of the at least one vehicle may then be corrected for the characteristic motion error.

Before entering the parking house, the position of the vehicle can be determined by the use of GPS data. As a result, a position of the vehicle when entering the building can be determined. When entering the parking garage, however, the determined GPS position degrades due to shielding of the GPS signals within the building. A further determination of the position within the building by GPS is usually only sporadically or not possible at all. Since a reliable use of GPS in a building to determine the position is eliminated, the vehicle in a building has available only an assessment of characteristic motion. However, the assessment of characteristic motion is subject to inaccuracies that are increasingly on the rise. Usually, the vehicle, after driving through the building, such as a parking garage, exhibits a heading and position error. Existing sensors of the vehicle, such as acceleration sensors, yaw rate sensors, control of steering actuators or steering aids and odometer, can be used to determine a position of the vehicle based on the last received GPS data. Once a GPS signal is again available in sufficient quality, the characteristic motion error in the parking garage caused by permanently integrating accelerations, yaw rates and odometry data can be determined. For this purpose, for example, a position of the vehicle while leaving from the parking house determined by the assessment of characteristic motion can be compared with current GPS data. The trajectory or interior trajectory ascertained within the parking garage can then be corrected in accordance with the characteristic motion error, so that at least a portion of the room of the building can be detected with the aid of the corrected trajectory within the parking garage. In particular, the navigable paths within buildings, such as parking houses or garages, can be determined thereby. For this purpose, only low technical requirements for the sensors of the vehicle are necessary. In particular, many vehicles require no additional sensors.

In one embodiment, the assessed trajectory is corrected in-vehicle and a corrected trajectory is transmitted to an external server unit. The determined GPS data and data of the assessment of characteristic motion may be transmitted continuously or at certain time intervals from the at least one vehicle to the external server unit. The external server unit may be, for example, a cloud. From the transmitted data, the external server unit can assume the trajectories within the building already corrected by the at least one vehicle. Since an external server unit can also have higher computing powers than an in-vehicle processor unit, data from many vehicles can also be computed simultaneously for the rapid generation or updating of at least one map. A map automatically generated from the collected data in the backend or the external server unit can then be provided to other vehicles. As a result, for example, advanced navigation and assistance functions can be provided in a parking garage.

In another embodiment, GPS data and characteristic motion data obtained from at least one vehicle are transmitted to the external server unit, and the assessed trajectory is corrected in the external server unit. In the backend or in the external server unit, multiple trajectories of one or more vehicles can be collected and initially aligned with each other based on the determined GPS positions outside the parking house. Due to the usually higher computing power of external server units compared to in-vehicle control units, the transmitted data can be processed faster and with more complex algorithms.

In some embodiments, the building is a parking garage, wherein sections and rooms of the parking garage are detected by the assessment of characteristic motion of at least one vehicle. By way of example, ramps and prominent points traversed by at least one vehicle in the building can be determined by correspondingly pronounced trajectories. This allows an accurate topological map of the building to be created and continuously updated. Also, any subsequent changes, such as construction work or permanent obstacles, may be taken into account as part of updates to the data and the map of the building generated therefrom.

According to a further embodiment, at least one level of the building is detected by assessment of characteristic motion and/or GPS data. One or more levels of a building can be detected. For example, by detecting a slope or a ramp, a change in altitude can be registered. As a result, several floors or levels, such as of a parking garage, can be detected cartographically. By way of non-limiting example, 3-axis acceleration sensors can be used for this purpose.

According to a further embodiment, at least one structural feature of the building is detected by the assessment of characteristic motion of the vehicle. Prominent driving maneuvers, for example, due to ramps with significant pitch-angle changes, combined with subsequent yaw-angle changes within the trajectory can be determined. With the appending of such prominent areas of the trajectory, a fine alignment of different trajectories to each other determined by vehicles can be carried out. In this way, a possible overall trajectory can be calculated from a plurality of independently determined trajectories. In particular, an overall image of the building can be determined from a plurality of trajectories from a plurality of vehicle-driven sections of the building.

According to a further embodiment, the assessment of characteristic motion of the vehicle is based on an inertial navigation system and/or an odometer and/or a GPS navigation system. As a result, all sensors available in the vehicle can be used to capture data that can be converted to a trajectory in a subsequent analysis. In particular, these sensors are already integrated in many current vehicles, so that no subsequent installation of additional sensors is necessary. This can reduce the cost of generating and updating the topological maps.

According to a further embodiment, at least one map is generated or updated from several passes through at least one room of at least one building. As part of a cluster analysis, multiple trajectories can be considered. As a result, an accuracy of the at least one map can be increased. For example, prominent points of the room can be searched for in several trajectories determined independently of one another, and the trajectories can be aligned and connected to one another on the basis of these points. For example, navigable roads within buildings can be identified and provided.

According to a further embodiment, at least one trajectory of the at least one vehicle created by assessment of characteristic motion is corrected for the characteristic motion error by an error model. The characteristic motion error can be subtracted from an entire trajectory using an error model. The individual partial errors along the trajectory can be determined, for example retroactively, depending on the driving maneuvers performed. Subsequently, the trajectory can be corrected successively based on the determined partial errors. The error model can be continuously optimized and improved and subsequently applied again to already corrected trajectories. As a result, the data already obtained can be optimally used and updated.

According to a further embodiment, at least one piece of information for the at least one map is determined by at least one optical and/or electromagnetic sensor. From the vehicles, additional information such as parking spaces, narrow points, ramps, traffic signs, etc. can also be detected by additional sensors along the trajectory and entered into topological maps, whereby additional information can be made available to the user or a driver assistance system. For example, traffic signs and instruction signs can be determined and integrated with an exact position in the at least one map.

According to a further embodiment, at least one parking space is determined in the at least one room of the at least one building. Parking processes and turning maneuvers within the building can be detected and registered by the method according to an embodiment as described herein. By way of non-limiting example, a defined off-time of the vehicle and a missing motion assessment can be used to identify a parking space and mark it on the map as a possible parking space. As a result, parking spaces which are oriented parallel and transverse to the roadway can be determined. All the parking spaces of a parking garage can thus be determined based on the trajectories of several vehicles in succession and transmitted to an external server unit as part of a map creation.

FIG. 1 shows a plan view of a schematic trajectory of a vehicle, in accordance with some embodiments.

FIG. 1 shows in particular a floor plan of a parking garage 1. In the floor plan of the parking garage 1, a schematic plan view of a trajectory 2, 4 of a vehicle is shown. At an entrance 6 into the parking garage 1, a vehicle can receive a current GPS signal one last time and thus determine its position relatively accurately within the context of the GPS accuracy. After entering the parking garage 1, a position determination of the vehicle based on the vehicle's own sensors takes place. In particular, in-vehicle acceleration sensors, yaw rate sensors, and odometers are used for an assessment of characteristic motion. The trajectory 2 determined by an assessment of characteristic motion has a continuously increasing error and deviates progressively more strongly from a real trajectory 4 as the distance within the parking garage 1 increases. In this case, a parking process 8 and thus a parking space 10 can be identified. The vehicle has made a change of direction and experienced no accelerations for a defined period of time. If the vehicle leaves the parking garage 1 through an exit 12, the vehicle can again receive a current GPS signal. In this case, an error 14 can be determined if the position of the vehicle determined by an assessment of characteristic motion at the exit 14 deviates from the GPS position of the vehicle. Based on the deviation or the error 14, the trajectory 2 determined by assessment of characteristic motion of the vehicle can be corrected retroactively to a corrected trajectory 4. Based on a plurality of corrected trajectories 4 of different vehicles or different passes of a vehicle, all passable routes and parking lots 10 of the parking garage 1 can be determined and stored in the form of a topological map.

In the following, method steps of the method for data generation will be explained in more detail according to an embodiment. In a first step, data is collected from at least one vehicle. In particular, this may be trajectories of multiple vehicles with data on the detected pitch and yaw angles as well as GPS data transmitted to an external server unit. In a further step, the data is processed. For example, ramps can be determined or extrapolated and height corrections can be carried out. As a result, a parking garage with several levels can be detected. For example, the ramps can be used for cluster analysis and used as prominent points to connect multiple trajectories. For this purpose, the ramps or the ramp centers of several trajectories can be superimposed. For example, a ramp height may be made from multiple trajectories as part of a least-squares fit. For this purpose, other parameters, such as pitch angle, are used. The respective trajectories can be adjusted or corrected independently of each other to the respective ramp heights or level heights. In a further step, the corrected trajectories can be connected, for example by a cluster analysis. In this case, for example, parking operations and turning maneuvers can be taken into account. In the cluster analysis, different features may have an individual weighting. For example, identified parking spaces may be weighted more heavily than identified temporary obstacles, such as incorrectly parked vehicles. Furthermore, a weighting of features of the cluster analysis can also be applied to different directions, such as x, y, z plane as well as to pitch and yaw angles and to a direction of travel.

LIST OF REFERENCE NUMBERS

1 Parking garage
2 Trajectory determined by assessment of characteristic motion
4 Corrected trajectory
6 Entrance
8 Parking process
10 Parking space
12 Exit
14 Error/deviation

The invention claimed is:

1. A data generation method for generating and updating a topological map of a room in a building in surroundings of a vehicle, by the vehicle, the method comprising:
   determining a position of the vehicle with current GPS data in front of an entrance to the building;
   assessing motion characteristic of the vehicle based on data from in-vehicle acceleration sensors, yaw rate sensors and odometers;
   assessing a trajectory of the vehicle in a space of the building based on the assessed motion characteristic of the vehicle;
   determining a motion characteristic error when leaving from the building by the vehicle based on comparison with current GPS data; and
   correcting the assessed trajectory of the vehicle for the motion characteristic error caused by permanently integrating accelerations, yaw rates and odometer data with aid of an error model that retroactively determines individual partial errors along the assessed trajectory as a function of driving maneuvers performed, and the determined partial errors.

2. The method of claim 1, further comprising transmitting, from the vehicle to an external server, the corrected assessed trajectory that is corrected in-vehicle.

3. The method of claim 1, further comprising transmitting, from the vehicle to an external server, GPS data and motion characteristic data, and wherein the assessed trajectory is corrected in the external server.

4. The method of claim 1, further comprising detecting the room or a section in the building based on an assessment of the motion characteristic of the vehicle, and wherein the building is a parking garage.

5. The method of claim 1, further comprising detecting a level of the building based on an assessment of the motion characteristic of the vehicle or GPS data.

6. The method of claim 1, further comprising detecting a structural feature of the building based on an assessment of the motion characteristic of the vehicle.

7. The method of claim 1, wherein the topological map is generated or updated from a plurality of passes through the room of the building.

8. The method of claim 1, wherein a piece of information for the topological map is determined based on an optical sensor or electromagnetic sensor.

9. The method of claim 1, wherein the space is determined in the room of the building based on a configurable time-off of the vehicle and a missing motion estimation.

* * * * *